United States Patent [19]

Howeth

[11] Patent Number: 4,465,497
[45] Date of Patent: Aug. 14, 1984

[54] PNEUMATIC CYCLIC EVENT TIMING ACTUATOR AND CONTROL CIRCUIT FOR USE WITH AIR BLAST FILTER CLEANING AND BULK MATERIAL BIN BLASTING SYSTEMS

[76] Inventor: David F. Howeth, 233 Chuck Wagon Trail, Fort Worth, Tex. 76108

[21] Appl. No.: 378,864

[22] Filed: May 17, 1982

Related U.S. Application Data

[63] Continuation-in-part of Ser. No. 315,753, Oct. 28, 1981, abandoned, which is a continuation of Ser. No. 146,160, May 2, 1980, abandoned.

[51] Int. Cl.³ ............... B01D 46/04; F15B 15/00
[52] U.S. Cl. .................................. 55/273; 55/287; 55/218; 55/431; 406/85; 406/137; 91/165; 91/416; 91/417 R; 91/410; 91/437; 137/624.14; 137/624.2
[58] Field of Search ............... 55/272, 273, 283, 284, 55/286, 287, 302, 303, 218, 431; 251/230; 137/624.14, 624.18, 624.2; 91/189 R, 304, 321, 417 R, 461; 406/85, 137; 41/165, 416, 437, 410

[56] References Cited

U.S. PATENT DOCUMENTS

| | | | |
|---|---|---|---|
| 2,619,073 | 11/1952 | Brooks et al. | 91/461 |
| 2,641,280 | 6/1953 | Fleischhauer | 137/625 |
| 2,803,110 | 8/1957 | Chittenden | 91/304 |
| 2,873,143 | 2/1959 | Williams | 406/85 |
| 2,953,248 | 9/1960 | Troland | 55/431 |
| 2,980,207 | 4/1961 | Allen | 55/302 |
| 3,048,151 | 8/1962 | Kudlaty | 121/38 |
| 3,066,688 | 12/1962 | Young | 137/624.18 |
| 3,073,097 | 1/1963 | Hallett et al. | 55/283 |
| 3,224,172 | 12/1965 | Eiben | 55/303 |
| 3,234,957 | 12/1966 | Allen | 91/461 |
| 3,332,217 | 7/1967 | Rymer | 251/230 |
| 3,521,430 | 7/1970 | Vanderlip et al. | 55/283 |
| 3,653,639 | 4/1972 | Mueller | 406/137 |
| 3,672,402 | 6/1972 | Bloemer | 91/417 R |
| 3,735,566 | 5/1973 | Laliwala | 55/273 |
| 3,910,303 | 10/1975 | Rydberg | 137/112 |
| 3,927,603 | 12/1975 | Bernhoft | 91/461 |
| 4,020,746 | 5/1977 | Arndt | 91/321 |
| 4,051,767 | 10/1977 | Landsberg | 91/420 |
| 4,116,216 | 9/1978 | Rosenberg | 137/624.13 |
| 4,372,193 | 2/1983 | Hall | 91/461 |

FOREIGN PATENT DOCUMENTS

| | | | |
|---|---|---|---|
| 637129 | 12/1978 | U.S.S.R. | 55/283 |
| 738640 | 6/1980 | U.S.S.R. | 55/283 |

*Primary Examiner*—David L. Lacey
*Attorney, Agent, or Firm*—Hubbard, Thurman, Turner & Tucker

[57] ABSTRACT

A cyclic or periodic event timing system for use in conjunction with a pressure fluid control circuit includes a cylinder and piston type actuator comprising a differential area piston which is exposed to fluid pressure from a flow conduit on opposite sides of a flow restricting orifice in the conduit or a branch portion thereof. The actuator piston includes a rod portion which is extended in one direction in response to an unbalanced pressure force on the piston. On the extension stroke, the actuator opens a valve to effect flow in the conduit resulting in a reduction in pressure which is sensed in the cylinder chamber exposed to the larger piston fluid area. The actuator piston then returns to an initial retracted position in response to an unbalanced pressure force. Improved pneumatic process control systems utilizing the event timing actuator are disclosed including reverse air pulse type cleaning system for an air filter having a plurality of valve actuated jet nozzles operable in timed sequence by a version of the actuator with a rotary cam connected to the timer piston. A negative pressure filter system includes blow-in doors for reverse pulsing the filters with air at atmospheric pressure, each door being operated by actuators timed in their operations by the cylinder and piston timer actuator. A bulk material bin dump and air blast control system for dislodging stuck material is actuated by the timer actuator interposed in the system control circuit.

16 Claims, 12 Drawing Figures

PNEUMATIC CYCLIC EVENT TIMING ACTUATOR AND CONTROL CIRCUIT FOR USE WITH AIR BLAST FILTER CLEANING AND BULK MATERIAL BIN BLASTING SYSTEMS

CROSS REFERENCE TO RELATED APPLICATIONS

This is a continuation-in-part of application Ser. No. 315,753, filed Oct. 28, 1981, now abandoned, which is a continuation of application Ser. No. 146,160 filed May 2, 1980, now abandoned.

BACKGROUND OF THE INVENTION

1. Field of the Invention

The present invention pertains to a pnuematic timing apparatus comprising a cylinder and piston actuator having differential effective pressure fluid areas on the piston which are in communication with a compressed air circuit including at least one orifice arranged such that a predetermined cycle timing function may be maintained substantially independent of variations in the air pressure in the circuit. The timing actuator is particularly adapted for use in conjunction with a pneumatic cleaning system for impingement type dust collector/filter units, for delivering momentary large volumes or pulses of pressure air for enhancing material flow from bulk material storage bins, and other apparatus utilizing the energy of pressure fluid flow.

2. Background Art

There are several applications for compressed air and other pressure fluids wherein periodic momentary flow of air is desired on a substantially constant cyclic basis. Although various pneumatic and other pressure fluid control systems are known which include timing devices for the periodic commencement or interruption of fluid flow, there has been a continuing need for improvements which will overcome the problems inherent in prior art equipment. For example, various electrical timing devices are known for use in conjunction with pressure fluid circuits; however, there are several important applications of pneumatic systems wherein a source of electrical energy is not available or considered sufficiently reliable. There are also several types of pneumatic or other pressure fluid timing circuits which are also lacking in reliability due to the need to provide very clean air in a protected environment to the system itself, and/or to maintain a constant control pressure in the system to provide an accurate repeat cycle timing function. Here again, applications of many pneumatic systems which include devices utilizing small flow control orifices suffer from contamination problems and/or are susceptible to wide variation in working fluid and control fluid pressures.

Two important applications of pneumatic timing devices lack substantially all of the requisites indicated above for trouble free operation of prior art timing apparatus. For example, in the application of dust collection and filtration units used in conjunction with blasthole drilling equipment and other industrial applications, it is known to use impingement or barrier type filter elements which are cleaned periodically by providing a momentary reverse flow of air through the filter elements to remove dust which was accumulated and caked on the upstream side of the filter media. The harsh environment in which many dust collection and filter units operate, and the unavailability of suitable electrical power, has made it particularly difficult to provide a suitable timing control system for effecting the reverse flow of pressure air for periodically cleaning the filter elements. Moreover, in most applications of this type of equipment it is highly desirable to maintain mechanical simplicity and reliability of the equipment and associated control devices, and to utilize control air from the same source as the working fluid, such as, in the case of drilling rigs, the on board compressor which is supplying bailing air for the drilling function. Furthermore, the wide variation in air supply pressures available on different types of drilling equipment as well as in other industrial compressed air systems is particularly bothersome in terms of developing a suitable repeat cycle timing system.

Another demanding application of a repeat cycle pneumatic timing device is in connection with equipment for maintaining suitable flow from bulk material storage bins and the like. For example, there is a technique to prevent clogging and flow interruption in large bulk material storage bins wherein a nozzle is properly arranged in the flow path of material in the bin to provide a momentary blast of air to loosen compacted material in the bin dischage portion. Here again, it is desirable to provide a timing control system which provides a constant cyclic pulse of fluidizing or blasting air, which is not susceptible to the harsh environment including contamination of the compressed air circuit and which is not affected by variations in pneumatic system supply pressure.

All of the desired features associated with providing the timing control function for the abovenoted types of equipment are provided by the present invention, which invention may be used in other applications as will be appreciated by those skilled in the art.

SUMMARY OF THE INVENTION

The present invention provides an improved pressure fluid timing apparatus which is mechanically uncomplicated, provides a cyclic timing function which is not materially affected by the condition of the pressure fluid for operating the apparatus and which may be adapted to operate effectively in conjunction with a variety of fluid systems having particular demands for such an apparatus.

In accordance with one important aspect of the present invention, the timing device is adapted for use with pneumatic systems and is characterized generally as a fluid actuator having a piston reciprocable in a cylinder or housing which is divided into opposed fluid chambers by the piston. The piston is provided with opposed pressure surfaces forming differential effective fluid areas and the fluid chambers are connected to a common source of compressed air by way of a circuit which includes a flow limiting orifice arrangement to effect control of the movement of the piston through a cycle including a timing or extension stroke and a retraction stroke in accordance with changing pressure forces acting on the opposed fluid areas. The timing actuator may be arranged in a pneumatic circuit to operate in a mode which is substantially unaffected by variations in the source or supply air pressure so that a substantially constant cyclic timing function may be provided.

In accordance with the present invention, there is also provided a linear cylinder and piston type actuator which is utilized as a timing device wherein a fluid supply conduit is in communication with opposed expansible chambers of the actuator. A timing orifice for controlling the cyclic operation of the actuator is disposed in a passageway in communication with the conduit and the chamber to which the larger effective piston fluid area is exposed. Differential piston face areas are formed by a piston rod which extends from one end of the actuator. By selection of the flow area of the timing orifice to experience a critical or subcritical flow velocity through the orifice under substantially all pressure conditions in the conduit, the rate of change of the ratio of the pressure upstream of the timing orifice to the pressure downstream of the orifice will essentially be the same during the filling of the chamber exposed to the larger piston face up to the pressure level required to move the piston (ignoring the effect of atmospheric pressure on the cross-sectional area of the piston rod). The air velocity across the orifice during the filling cycle will be in a critical or choked flow state as long as the pressure ratio across the orifice is 0.528 or below. If, during filling of the chamber, the pressure ratio exceeds 0.528, the velocity becomes subcritical and will essentially reduce in proportion with the square root of the pressure ratio until the pressure ratio reaches a level equal to the ratio of the smaller piston pressure surface area to the larger piston face or pressure surface area, at which time piston movement begins. During piston movement, the pressure ratio across the timing orifice will be essentially as determined by the pressure ratio across the piston. Accordingly, if the ratio of the smaller piston pressure surface to the larger piston pressure surface is 0.528 or less, the flow across the timing orifice is essentially in critical or choked flow state during both filling and piston extending phases.

However, regardless of supply pressure condition, the rate of pressure ratio changes will be essentially constant throughout the cycle. If it is desired to change the cycle period, the flow area of the timing orifice may be changed to acquire a different spectrum of pressure ratios or the volume of the conduit in communication with the opposed expansible chambers and/or the volume of the expansible chambers may be changed. The equation for sub-critical flow across a sharp edged orifice (having a discharge coefficient of 0.6) may be expressed as:

$$Q = 33 D_o^2 P_u \sqrt{r(r^{43} - r^{71})}$$

where:
Q = air flow (standard cubic ft./min.)
$D_o$ = diameter of equivalent sharp edged orifice
$P_u$ = absolute pressure, psia, upstream of orifice
$P_d$ = absolute pressure, psia, downstream of orifice
r = pressure ratio $P_d/P_u$ In accordance with another aspect of the present invention, the timing actuator has opposed pressure chambers in direct communication with a main pressure fluid flow line for a fluid system which is controlled by the timing apparatus, and wherein a fluid flow restricting orifice may be interposed in the main fluid flow line to effect a differential pressure condition in the respective pressure chambers of the actuator to provide for a complete reverse or retraction stroke of the piston. Depending on the characteristics of the fluid system downstream of the orifice, and the desired timing cycle of the actuator, this orifice alone may serve as the timing orifice for effecting cyclic operation of th timing actuator. The actuator may be interconnected with a shutoff valve disposed in the conduit immediately downstream of the timing orifice and the passageway leading to the chamber exposed to the larger piston fluid area. In such an arrangement the timing characteristics of the actuator and the system are substantially dependent on the volume of the actuator chamber exposed to the larger piston fluid area as well as the size of the timing orifice.

In accordance with yet another aspect of the present invention, there is provided a timing actuator wherein opposed pressure fluid chambers in the actuator are in communication with a main working fluid flow line which is provided with a venturi or minimal pressure loss nozzle interposed in the flow line between passageways leading to the actuator chambers. The passageway leading to the piston chamber exposed to the larger piston fluid area includes a timing orifice and is in communication with the main flow line at the throat of the venturi so as to be exposed to a reduced pressure in relation to the pressure of the fluid acting on the other piston fluid area during fluid flow through the main flow line. In this way, the timing actuator may be used in conjunction with fluid flow systems wherein a large pressure drop through the main flow line is to be avoided. The timing characteristics of the timing actuator may be further modified by including a one way check valve interposed in a bypass conduit around the timing orifice in the passageway leading to the chamber exposed to the larger piston fluid area so that the retraction stroke of the piston is not dependent on flow through the timing orifice.

The timing system of the present invention also utilizes relatively large flow control orifices and actuator means which are arranged and sized such that they are substantially unaffected by fluid contaminants normally found in industrial pneumatic systems. The timing system is adapted to function with flow control orifices which, for example, are on the order of two to three times the diameter of orifices commonly used in industrial pneumatic logic control devices.

In particular, the timing apparatus of the present invention is advantageously combined with a control circuit for providing reverse flow of cleaning air to one or more impingement type filter elements in a dust collection and filtration system for use with blasthole rock drills. The mechanical simplicity of the timing apparatus, the insensitivity of the apparatus to contaminants in the fluid circuit, and the ruggedness and reliability of the timing actuator are features which are particularly attractive for applications in conjunction with a reverse air flow cleaning system for a dust collector unit.

The present invention also contemplates the combination of a timing actuator of the type described hereinabove with a bulk material storage bin pneumatic blasting or material flow enhancement system wherein the timing actuator may be directly connected to the main fluid flow line for the system.

Still further in accordance with the present invention, there is provided a combination timing and sequencing actuator for sequentially actuating a series of control elements at precise timed intervals. The control elements may be a plurality of pilot control or poppet valves which are each connected to compressed air supply valves for delivering momentary large volumes of compressed air for use in reverse flushing of impingement type air filters or the like. The combination timing and sequencing apparatus utilizes a rotary cam connected to the rod end of a piston actuator which forms the timing actuator as well as a mechanical actuator for sequentially operating the pilot control valves.

Those skilled in the art will recognize further superior features and advantages of the present invention upon reading the detailed description which follows in conjunction with the drawings.

DESCRIPTION OF THE PREFERRED EMBODIMENTS

Figure 1:
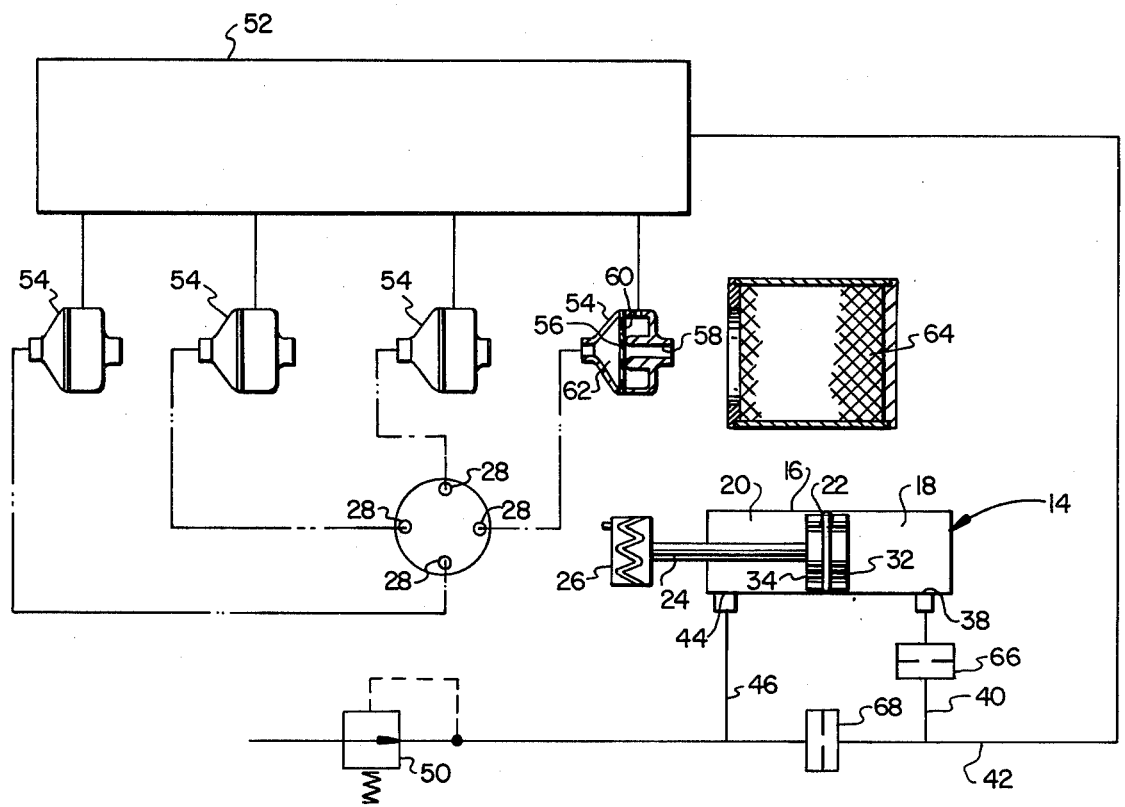
FIG. 1 is a schematic diagram of a pneumatic timing and sequencing apparatus in accordance with the present invention.

In the description which follows, like parts are marked throughout the specification and drawings with the same reference numerals, respectively. The drawings are not necessarily to scale. In the schematic diagrams, standard component symbols are used except in instances wherein the operation of a component is more clearly and readily understood by showing a somewhat schematic representation thereof.

Referring to FIG. 1, one embodiment of a timing apparatus in accordance with the present invention is shown in conjunction with a system for providing sequentially timed momentary flow of pressure air for backflushing or cleaning impingement type air filters of a type used in dust collection and filtration units such as, for example, on board blasthole drilling rigs used in the mining and quarrying industry. FIG. 1 illustrates in schematic form a cylinder and piston type actuator generally designated by the numeral 14. The actuator 14 together with certain arrangements of orifices or other flow restricting elements described herein performs a cyclic timing function as will be described further herein. For convenience the actuator 14 and similar actuator embodiments to be described will be referred to as timing actuators to distinguish from other actuators described and shown in the drawing. The actuator 14 includes a cylinder 16 which is divided into opposed fluid chambers 18 and 20 by a movable piston member 22. The piston 22 includes a rod portion 24 extending through one end wall of the cylinder 16 and is connected to a suitable mechanism 26 such as a cam which may be used to actuate one or more elements comprising, for example, a plurality of poppet type pilot valves, shown schematically and designated by the numeral 28. The piston 22 is provided with opposed pressure surfaces or fluid areas 32 and 34 which are exposed to the fluid pressure in the chambers 18 and 20, respectively. The effective pressure surface or area 32 acting to move the piston 22 to the left, viewing FIG. 1, is greater than the effective area 34 exposed to the chamber 20 and responsive to pressure fluid in that chamber to move the piston to the right. The area 32 is greater than the area 34 due to the cross-sectional area of the piston rod 24. Accordingly, when the fluid pressure in the chambers 18 and 20 reaches a minimum predetermined differential, an unbalanced force will act on the piston to move it to the left to extend the rod 24 from the cylinder 16. The movement of the piston to the left, viewing FIG. 1, may be considered the forward or timing stroke and the movement of the piston to the right may be considered the return or retraction stroke.

The cylinder 16 includes a port 38 opening into the chamber 18 and connected to a conduit or passageway 40 which is in communication with a working fluid flow line or conduit 42. The cylinder 16 is also provided with a port 44 which opens into the chamber 20 and is in communication with a conduit or passageway 46 which also is connected to the working fluid conduit 42. The working fluid conduit 42 is preferably connected to a source of pressure fluid, such as compressed air, which may be one of a variety of sources but for the sake of discussion could be considered to be a bailing air compressor on board a blasthole drilling rig, not shown. Typically, a compressor in such an application, delivers pressure air in substantial quantities in the range of 600 to 1200 cubic feet per minute at pressures ranging from 60 psig to 150 psig. With a pressure source such as described above, it is normally preferred, if possible, to provide a pressure regulating valve such as the valve 50 interposed in the main conduit 42 and upstream of the timing actuator 14.

The diagram of FIG. 1 shows, in schematic form, a reservoir or manifold 52 connected to the conduit 42 for receiving and storing a quantity of pressure air at a pressure corresponding substantially to the setting of valve 50 for delivery to a plurality of quick opening pneumatically actuated valves 54. As shown by way of example, the valves 54 are of the type which may include a flexible diaphragm type closure member 56 which is operable to close over a discharge passage 58 when the fluid pressure on opposite sides of the diaphragm is substantially equal. A small orifice 60 is provided in the diaphragm to interconnect opposed fluid chambers within the interior of the valve housing, as illustrated. The pressure in chamber 62 may be reduced by way of a pilot valve such as one of the valves 28 to allow the diaphragm 56 to flex away from the mouth of the passageway 58 and allow a brief, large volume of pressure air to be delivered by the valve 54 to flush dust and debris from the exterior surface of a porous media impingement type air filter or dust collector generally designated by the numeral 64. Additional detailed embodiments of dust collection and filtration units particularly adapted for use with the present invention will be described in further detail herein in conjunction with FIGS. 5 and 9.

The timing actuator 14 includes means in the passageway 40 to restrict flow into and out of the chamber 18. Such flow restricting means may comprise an timing orifice 66 which may be adjustable as to the size of its cross-sectional flow area and may be formed by a gate or plug type valve or the like, for example. The arrangement of the present invention, as shown in FIG. 1, also includes a second flow restriction means or orifice 68 interposed in the conduit 42 between the passageways 40 and 46. The orifice 68 may also be adjustable as to the size of its effective flow area and is preferably maintained larger in its effective flow area than the orifice 66. The orifices 66 and 68 are also selected to have effective flow areas such that in normal operation of a pneumatic system associated with the timing actuator 14 the orifices experience a critical or subcritical flow condition under substantially all operating conditions of filling of the reservoir 52 and operation of the actuator 14. This flow condition may exist for flow both into and out of the chamber 18 through orifice 66.

A major advantage of the timing apparatus illustrated in FIG. 1 is that the operating cycle of the apparatus is substantially independent of pressure of the fluid supplied to conduit 42 and is essentially dependent on critical and subcritical flow and the consistent rate of charge of pressure ratios over orifice 66 and 68, the volume of the manifold 52 and the volume in pressure chamber 18.

By way of example, a typical operating cycle of the timing actuator 14 will now be described. If pressure fluid such as compressed air is supplied to the conduit 42 and all of the valves 54 are closed, the pressure force acting on surface 32 will increase to the proper ratio of the pressure force on surface 34 as the flow through the conduit 42 to the reservoir 52 subsides and the pressure in chamber 18 increases to a pressure slightly less than the pressure in the chamber 20. The rate of flow into the chamber 18 will be no greater than that determined by the ratio of the downstream pressure to the upstream pressure across the orifice 66. During the initial phase of flow through the conduit 42, assuming that the manifold 52 had previously been evacuated, the pressure in chamber 20 will be greater than the pressure in chamber 18 due to the restriction provided by the retraction orifice 68 and the restriction of orifice 66. Accordingly, the piston 22 will move to the right on its retraction stroke until such time as the pressure ratio across the orifice 66 exceeds the ratio of the area of the surface 34 with respect to the surface 32 whereupon an unbalanced force will act on the piston moving it to the left, viewing FIG. 1, to effect extension of the rod 24 from the cylinder. Upon movement of the actuating piston 22 to the left as described above, the cam 26 will actuate one of the valves 28 to effect opening of an associated quick exhaust valve 54 to provide rapid flow of air out of the manifold 52 and a subsequent drop in pressure of the fluid in the manifold and in the conduit 42 downstream of the orifice 68. Fluid in the chamber 18 will now flow out of the chamber through the orifice 66 into the conduit 42 whereupon the pressure in the chamber 18 will decrease below the pressure in the chamber 20 sufficiently such that the piston 22 will move to the right on the retraction stroke of the actuator 14. Movement of the piston to the right will cause the valve 28 which was engaged by the cam 26 to close thereby closing the associated valve 54. Continued flow of fluid through the conduit 42 to the reservoir or manifold 52 will result in a pressure buildup in the portion of the conduit downstream of the orifice 68 and as fluid flows into the chamber 18 through orifice 66, pressure increases in that chamber until an unbalanced force acts again on the piston 22 to move it to the left on its extension stroke whereby the timing cycle will be repeated. As will be described further herein in conjunction with the embodiment of FIG. 3, the cam 26 is suitably adapted to rotate or index in such a way that a second valve 28 is actuated and its associated valve 54 is opened rapidly to provide pressure air to an associated filter or other means, not shown. Accordingly, the timing actuator 14, which also functions as a sequencing actuator, as will be described further herein, performs a timing cycle of operation which is dependent on the flow of fluid into and out of the chamber 18.

Those skilled in the art will appreciate that an actuator of the mechanical simplicity and reliability as described herein is particularly advantageous for use in conjunction with systems which provide relatively high volumes of working fluid such as clean or contaminated compressed air or the like. The actuator 14 may be sized in such a way that the orifices 66 and 68 are sufficiently large as to resist clogging by any contamination which would likely be in the dirtiest industrial or other compressed air system. Moreover, as long as the flow through the conduit 42 is sufficient to provide critical or subcritical flow a consistent rate of change of pressure ratio occurs across orifices 66 and 68 and the operating cycle time of the actuator 14 will not vary materially with variations in pressure of the fluid being supplied through the conduit 42 from the source. Those skilled in the art will appreciate that the timing actuator 14 may be used in conjunction with various pneumatic and other pressure fluid systems and is particularly advantageous for use in direct connection with a system which requires periodic timed discharge of fairly large volumes of pressure air.

Figure 2:
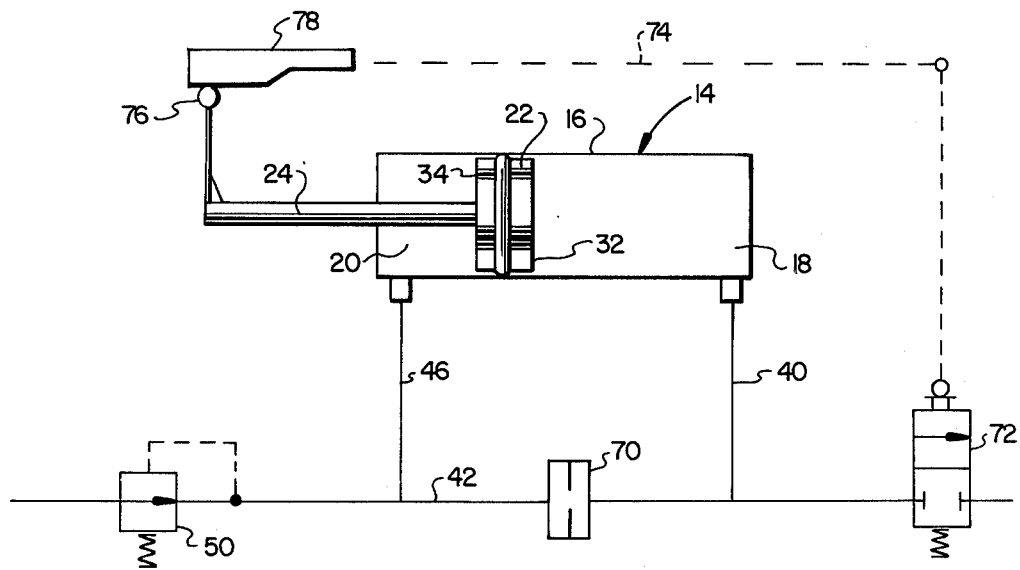
FIG. 2 is a schematic diagram of an alternate embodiment of a pneumatic timing apparatus according to the present invention.

An alternate embodiment of a timing actuator arrangement is illustrated in FIG. 2. In the arrangement according to FIG. 2, the timing actuator 14 is connected to the main working fluid conduit 42 by the branch passageways or conduits 40 and 46 as in the arrangement of FIG. 1; however, the flow restriction or orifice interposed in the conduit 40 between the main working fluid conduit and the chamber 18 has been eliminated and a combination timing and retraction orifice 70 is interposed in the conduit 42 between the branch passageways 40 and 46. The arrangement of FIG. 2 also includes a shutoff valve 72 interposed in the conduit 42 downstream of the passageway 40. The timing characteristics of the system in accordance with FIG. 2 rely primarily on the diameter of the orifice 70 and the volume of the chamber 18. Accordingly, the location of the valve 72 should be such that the volume of the conduit 42 between the orifice 70 and the valve, and the volume of the passageway 40 will be negligible.

In the arrangement according to FIG. 2, it is assumed that the valve 72 may be operated to be opened and closed by suitable linkage or actuating means, generally designated by the numeral 74, connected to piston 22 and responsive to movement of the piston on its extension stroke and its retraction stroke, respectively. For example, the linkage 74 may include a cam 76 connected to the piston rod 24 and operable to actuate a follower 78 so that at a preselected point on the extension stroke of the piston 22 the valve 72 will be opened. Moreover, the orifice 70 may be adjustable in size but is typically sized to maintain a critical or subcritical flow condition, and thus a consistent rate of change of pressure ratios when filling the chamber 18. Typically, the effective fluid areas or surfaces 32 and 34 are selected such that an unbalanced force will operate to extend the piston 22 to initiate a timing cycle of the actuator 14 when the ratio of the pressure downstream to the pressure upstream of the orifice 70 slightly exceeds the ratio of area of surface 34 with respect to surface 32. In this way, the operation of the actuator 14 in the arrangement of FIGS. 1 and 2 is substantially independent of the pressure of the fluid in the conduit 42. In the arrangement of FIG. 2, only the volume of the chamber 18 is considered as effecting the timing characteristics of the movement of the actuator 14. If the volume of the conduit 42 between the orifice 70 and the valve 72 is relatively large, such as by inclusion of a manifold or reservoir, then such conduit volume would be a factor in determining the overall elapsed time of an operating cycle of the actuator 14.

Figure 5:
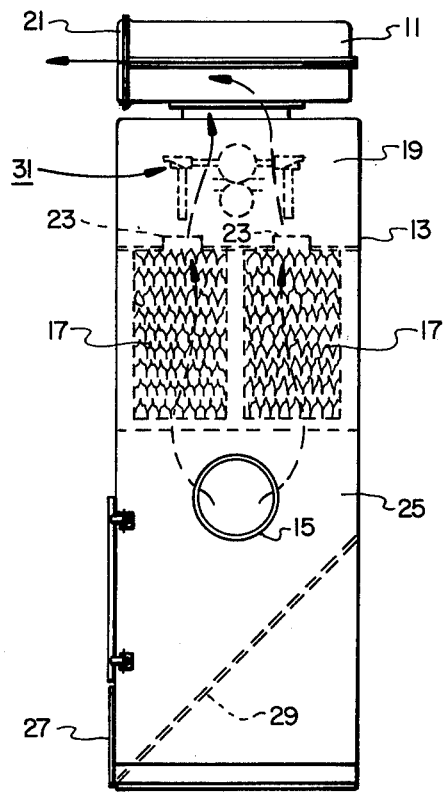
FIG. 5 is a schematic side elevation view showing a dust collection apparatus in which the device shown in FIG. 3 may be installed.

As mentioned previously, applications for which the pneumatic timing and sequencing apparatus of the present invention are particularly useful, include controls for reverse flushing or cleaning of impingement type filter elements in dust collection systems of various types and, in particular, systems used in blasthole drilling operations in the mining and quarrying industries. A typical dust collector for such a system is shown schematically in FIG. 5. Referring to FIG. 5, dust laden air is drawn from a shroud (not shown) surrounding the blasthole being drilled by means of a fan 11 which is mounted on top of a dust collector cabinet 13. The dust laden air passes via an inlet conduit 15 into the cabinet 13. All of the air entering the cabinet 13 must then pass through one of a plurality of filter elements 17. A typical dust collector may have from four to eight filter elements. The collector illustrated in FIG. 5 typically has six filter elements. The air passing through the filter elements 17 enters an upper compartment 19 of the cabinet 13 as substantially dust free air and is exhausted to atmosphere through the fan 11 and an outlet conduit 21. In such an arrangement, the filter elements 17 quickly become caked and clogged with dust particles if suitable provision is not made to prevent excessive dust accumulation.

One method for cleaning accumulated dust from a filter element 17 is to introduce a momentary flow of compressed air into the filter element outlet 23 thereby momentarily reversing the air flow through the filter element. If the momentary flow of compressed air has sufficient energy, the accumulated dust in and on the filter element is blown loose and falls into the lower cabinet compartment 25 beneath the filter elements 17. The dust that is blown loose is not picked back up into the air stream because of the very low air velocity in the lower cabinet compartment 25 and the compaction of the dust particles that occurred on the surface of the filter element. A flexible dump flap 27 is held in closed position during operation of the fan 11 but opens when the fan 11 is stopped at intervals when the drilling operation is suspended, thus allowing accumulated dust to dump into an appropriate receiver (not shown). An inclined surface 29 forms the bottom of the lower cabinet compartment 25 so that the force of gravity will dump the accumulated dust.

Figure 4:
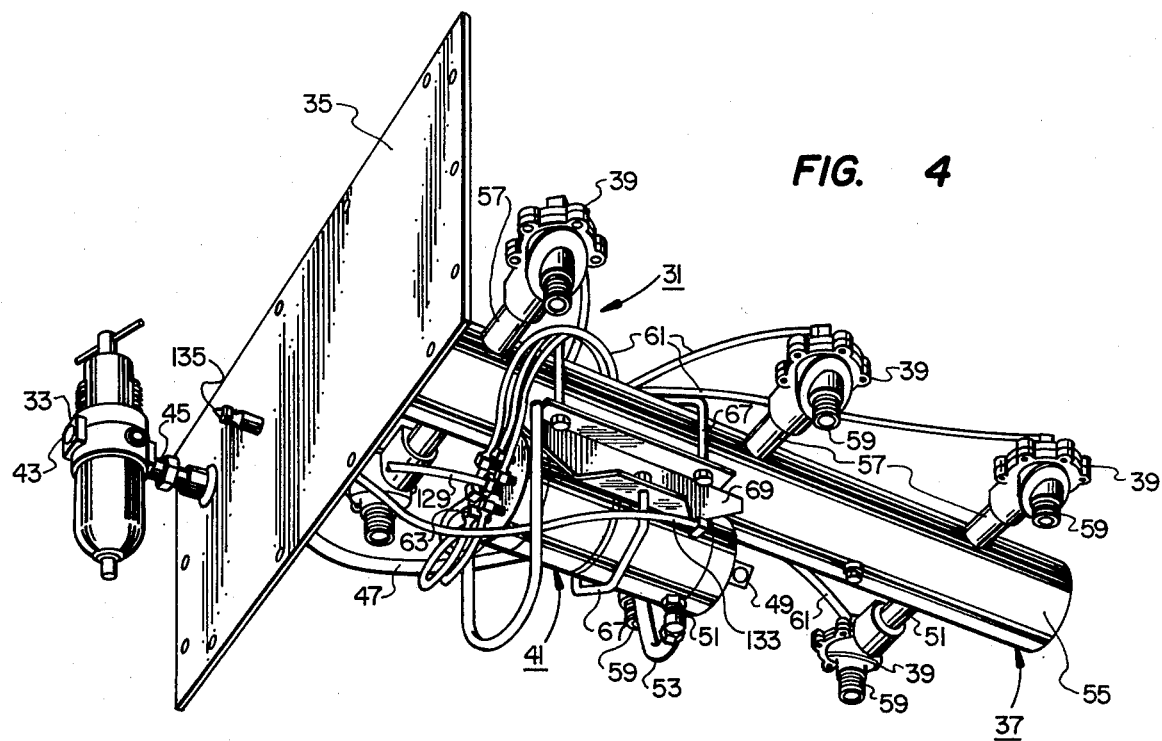
FIG. 4 is a perspective view showing the timing and sequencing apparatus of FIG. 3 installed in a quick exhaust valve and manifold assembly for a dust collection system.

Since it is desirable to maintain as nearly as possible a constant air flow through the dust collector, the filter elements 17 must be cleaned one-at-a-time in a repeated sequence. The filter cleaner assembly 31 is mounted within the dust collector cabinet upper compartment 19 and is best shown in FIG. 4 as comprising an air pressure regulator 33, a mounting panel 35, a manifold 37, a plurality of quick opening exhaust valves 39, and a timing and sequencing device 41.

It is desirable that the air cleaner assembly 31 should utilize the compressed air supply normally available from the drilling machinery at the site of operation, both to supply the energy for the filter cleaning air flow and to operate the timing and sequencing apparatus. The compressed air from such supply (not shown) is connected to a regulator inlet 43, and the regulator outlet 45 is connected via a conduit 47 to an inlet port 49, and from an outlet port 51 via conduit 53 to the manifold inlet (not shown).

The manifold 37 comprises a cylindrical body portion 55 and a plurality of outlet conduits 57. A quick opening exhaust valve 39 is mounted to each outlet. There is a valve 39 for each filter element 17 (six in the embodiment shown). The manifold outlet conduits 57 are arranged in spaced parallel pairs, with the outlets of each pair being on opposite sides of the cylindrical body portion 55 and extending transversely of the cylindrical body portion. The outlet conduits 57 are dimensioned and disposed so that when the respective valve 39 is mounted, its exhaust outlet 59 will be a short distance above and centered on the respective filter element outlet 23. The exhaust valves 39 are actuated to discharge a cleaning flow of compressed air by an air bleeding action. Each exhaust valve 39 is connected via a respective air bleed conduit 61 to a respective poppet valve 63 which is connected on the poppet end closure 65 of the timing and sequencing apparatus 41. The apparatus 41 is mounted and fixed by suitable means (straps 67 and brackets 69) to the manifold cylindrical body portion 55.

Figure 3:
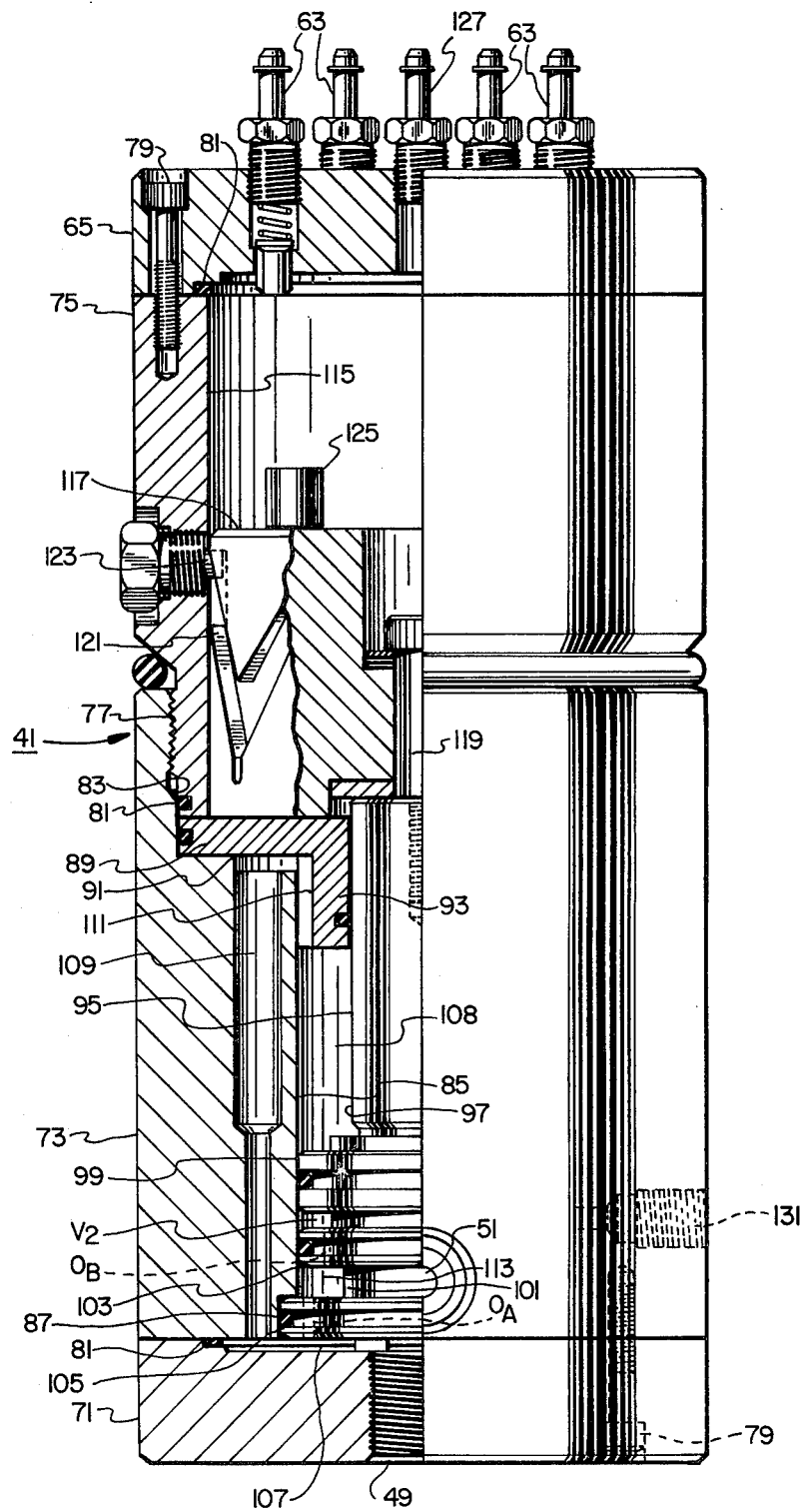
FIG. 3 is a schematic side elevation view with a quarter section removed showing a timing and sequencing apparatus in accordance with another embodiment of the present invention.

The timing and sequencing apparatus 41 in accordance with one embodiment of the invention is shown by FIG. 3. The apparatus 41 comprises an inlet end closure 71, a timer portion housing 73, a sequencer portion housing 75, and poppet end closure 65. The timer portion housing 73 and the sequencer portion housing 75 are generally cylindrical and are joined by mating threaded portions 77. The inlet end closure 71 and the poppet end closure 65 are fixed respectively to the outer ends of the timer portion housing 73 and the sequencer portion housing 75 by means of cap screws 79. Suitable seals 81 are provided to prevent air escape from the timer and sequencer device interior at these joints.

The timer portion housing 73 has a first cylindrical bore 83 adjacent threaded portion 77 which merges with a second and smaller cylindrical bore 85 which in turn merges with a third cylindrical bore 87 larger than the bore 85 and which opens to the inlet end of the timer portion housing 73. The first cylindrical bore 83 sealingly receives the flange portion 89 of a piston rod guide 91 which has a tub portion 93 that sealingly receives the rod portion of a piston 97. The flange portion 89 is clamped between the shoulder that is intermediate the first and second cylindrical bores 83, 85 and the inner extremity of the sequencer portion housing 75. The piston 97 has a head portion 99 that sealingly engages and is reciprocable within the second cylindrical bore 85.

A spool member 101 has a first flange portion 103 that sealingly engages the outer end portion of the second cylindrical bore 85 and a second flange portion 105 that sealingly engages the third cylindrical bore 87. The spool member 101 is clamped at its second flange 105 between a shoulder intermediate the second and third cylindrical bores 85, 87 and the inner surface of the inlet end closure 71. Compressed air from the regulator 33 may be admitted at the inlet port 49 to a space 107 formed by a recess in the inlet end closure 71. The space 107 communicates via a passage 109 in the timer portion housing 73 and a slot 111 in the hub portion exterior of the piston rod guide 91 to the space or chamber 108 on the rod side of piston 97. The space 107 also communicates via an orifice $O_A$ in the spool member second flange portion 105 to the space 113 between the spool first and second flange portions 103, 105 and from there via outlet port 51 and conduit 53 to the interior volume $V_1$ of the manifold 37. The space 113 also communicates via an orifice $O_B$ in the spool member first flange portion 103 to a chamber $V_2$ between the first flange portion 103 and the blind side of piston head portion 99.

The housing portion 75 has a cylindrical bore 115 which receives a cylindrical sequencer cam or barrel 117 for reciprocation therein. The sequencer cam 117 is journalled for free rotation about a bearing and retainer shaft 119 the inner end of which threadedly engages the outer end portion of the piston rod portion 95. The sequencer cam 117 has a peripheral slot configuration 121 that provides a number of cam stations equal to the number of filter elements 17, and valves 39 that are being utilized in the dust collector system. A cam follower 123 is threadedly fixed to the sequencer portion housing 75 sidewall and engages the slot configuration 121. Each stroke of the piston 97 of course provides a stroke of the sequencer cam 117, and each stroke of the sequencer cam 117 causes it to be rotated from one cam station to the next. A poppet valve actuator 125 is fixed to the outer end of the sequencer cam 117 and protrudes outwardly therefrom.

Every time the sequencer cam 117 approaches the extremity of its stroke, the poppet actuator 125 engages a poppet valve and forces it to open so as to cause air to be bled from a corresponding exhaust valve 39, thus causing that valve to momentarily open to emit a cleaning flow of compressed air. Thus, repeated reciprocation of the piston 97 will cause repeated stroking of the sequencer cam 117 which in turn will cause the poppet valves 63 and hence the quick exhaust valves 39 to be actuated in a repeated sequence. The air that is bled by the poppet valves 63 is exhausted to the atmosphere via a passage in the poppet end closure 65, a fitting 127 and a conduit 129. The timer portion housing 73 has an outlet 131 which communicates with the space or volume $V_1$ and also via a conduit 133 to a reset valve 135 which is located on the front of the mounting panel 35. The reset valve 135 functions to dump air from the chamber $V_2$ and force the completion of the retracting stroke of the piston 97 in the event that the piston should fail to complete its retracting stroke in the normal manner.

Figure 6:
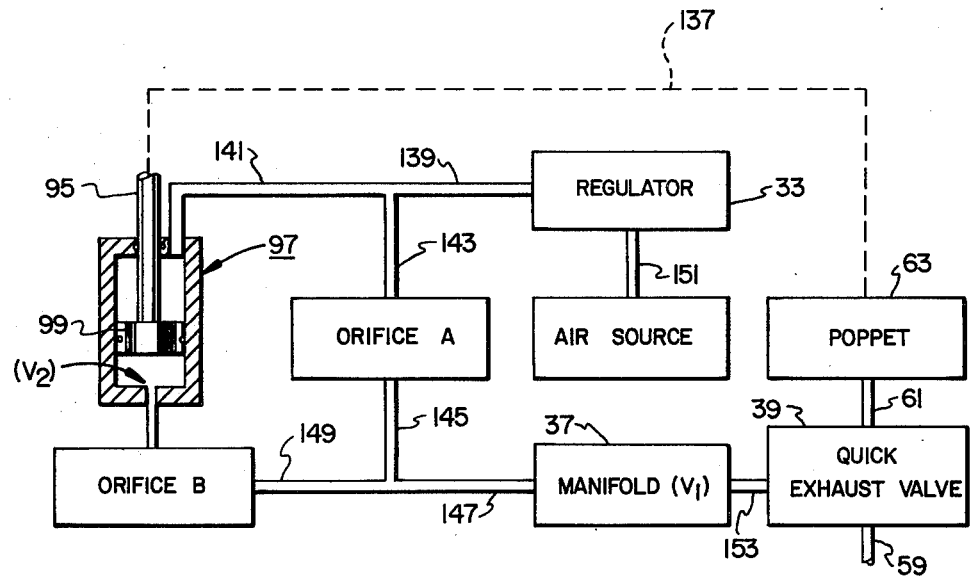
FIG. 6 is a schematic block diagram of the pneumatic timing and sequencing apparatus of FIGS. 3 and 4.

The operation of the timer portion of the timer and sequencer device 41 may be explained with reference to the schematic block diagram of FIG. 6 and the graphs of FIGS. 7 and 8. It should be understood that the timed strokes of the piston 97 may be utilized to perform any desired function. In FIG. 6, the action of the sequencer is represented simply as a mechanical linkage 137. Also, in FIG. 6 there is, for simplicity, shown only a single poppet 63 and a single exhaust valve 39.

Compressed air from a suitable source, such as the source normally available at an operations site to serve various functions, is fed via a conduit 151 to the inlet 43 of regulator 33. The regulated air from the regulator outlet 45 is fed via conduits 139, 141 to the chamber 108 on the rod side of piston 97, and via conduits 139, 143 to orifice $A(O_A)$. Air from orifice A is fed via conduits 145, 147 to manifold 37 $V_1$, and via conduits 145, 149 to orifice $B(O_B)$. The manifold 37 is connected via conduit 153 to quick exhaust valve 39. Air is fed from orifice B to the chamber $V_2$ on the blind side of the piston 97.

Assume that the exhaust valve 39 has been actuated to emit a cleaning flow of air (at the time zero in FIG. 8), so that the pressure in the manifold 37 $V_1$ drops rapidly to a low value (near atmospheric pressure). Because the air supply from regulator 33 must pass through orifice A the pressure in manifold 37 builds back up to its maximum value during a time interval shown by FIG. 8 as a little less than four seconds. During the first portion (about one second) of this time interval the chamber $V_2$ pressure drops as air moves out of chamber $V_2$ via orifice B toward $V_1$. When the fluid pressure in chamber $V_2$ has dropped to a value such that the pressure times the effective piston blind end area is less than the regulated pressure times the effective piston rod end area, the piston 97 begins its retracting stroke. The piston 97 then retracts at a substantially constant rate until it reaches the end of its retracting stroke. The piston retracting stroke takes a time interval of about one second. During the piston retracting stroke, the pressure in chamber $V_2$ remains substantially constant because of the relationship between the decreasing $V_2$ volume and the rate of air flow through orifice B. When the piston reaches the end of its retracting stroke, the volume $V_2$ becomes constant and so the $V_2$ pressure in chamber $V_2$ drops until the pressure volume $V_1$ builds sufficiently to reverse the air flow through orifice B at which time the $V_2$ pressure begins to rise. Then the $V_2$ pressure continues to rise until the $V_2$ pressure times the piston blind end area exceeds the regulated pressure times the piston rod end area at which time the piston 97 begins its extending stroke (at about time two seconds in FIG. 8). The piston 97 extends at a substantially constant rate until it reaches the end of its extending stroke (at about time four seconds in FIG. 8). During the extending stroke of piston 97 the pressure in chamber $V_2$ remains substantially constant because of the relationship between the increasing $V_2$ volume and the rate of air flow through orifice B. When the piston 97 reaches the end of its extending stroke the volume of chamber $V_2$ becomes constant and so the $V_2$ pressure increases until the next exhaust valve 39 in the sequence has been fired and then decreases until the piston 97 again begins its retracting stroke at which time the $V_2$ pressure again becomes constant.

An important feature of the present invention is that the pneumatic timer cycle time is substantially constant over a wide range of air supply pressures. As can be seen from FIG. 8, the time for one cycle of the timer is made up of (1) the time of dwell of the piston at the extended stroke end, (2) the time of piston travel during the piston retracting stroke, (3) the time of dwell of the piston at the retracted stroke end, and (4) the time of piston travel during the piston extending stroke.

The dwell times of (1) and (3) above depend on the ratio of the rod end to blind end areas of the piston 97, the sizes of orifice A and orifice B, and the volume ($V_1$) of manifold 37, all of which are constant. Consequently, these dwell times are entirely independent of air supply pressure. The piston travel times of (2) and (4) above are constant because the applied forces are constant. The applied forces are the piston rod end pressure (which is the same as the air supply pressure and can be considered as constant for the brief period of a given timer cycle) times the effective piston rod end area (which of course is constant) and the $V_2$ pressure (which is constant during the piston travel times as hereinabove explained) times the effective piston blind end area (which is of course a constant). It is thus apparent that the piston travel times are independent of air supply pressure.

Since both the dwell times (1) and (3) above and the piston travel times (2) and (4) above are independent of air supply pressure, it follows that the pneumatic timer cycle time is independent of air supply pressure, and can be said to be substantially constant at least over a wide range of air supply pressures.

Another feature of the present invention is that the pneumatic timer 41 has relatively few working parts and can be ruggedly constructed so that it is highly reliable in operation even in hostile environments and also is susceptible to normally available field maintenance.

Figure 7:
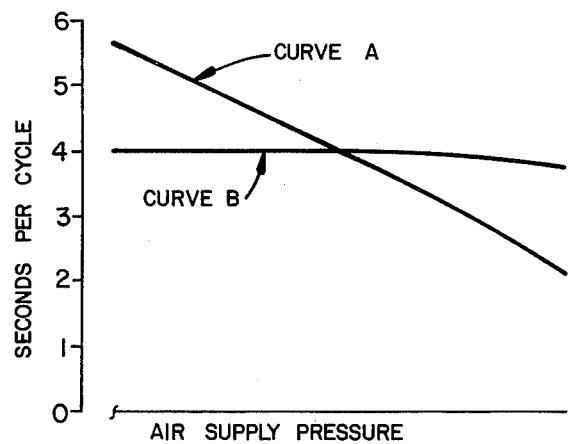
FIGS. 7 and 8 are graphical diagrams illustrating operating characteristics of one embodiment of the timing and sequencing apparatus of the present invention.
Figure 8:
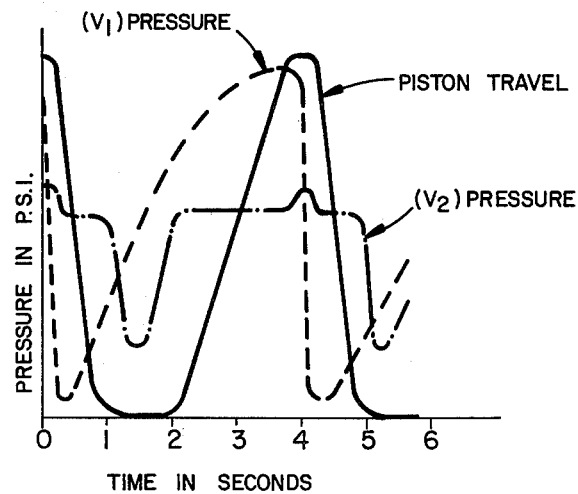

It is understood that the graphs of FIGS. 7 and 8 are generalized for illustration purposes and were not drawn from actual data. Curve A of FIG. 7 simply illustrates that the pneumatic timers of the prior art of which I am aware have cycle times that vary considerably with variations in air supply pressure, whereas curve B of FIG. 7 illustrates that the cycle time of the pneumatic timer of the present invention is substantially constant over a wide range of air supply pressures.

Figure 9:
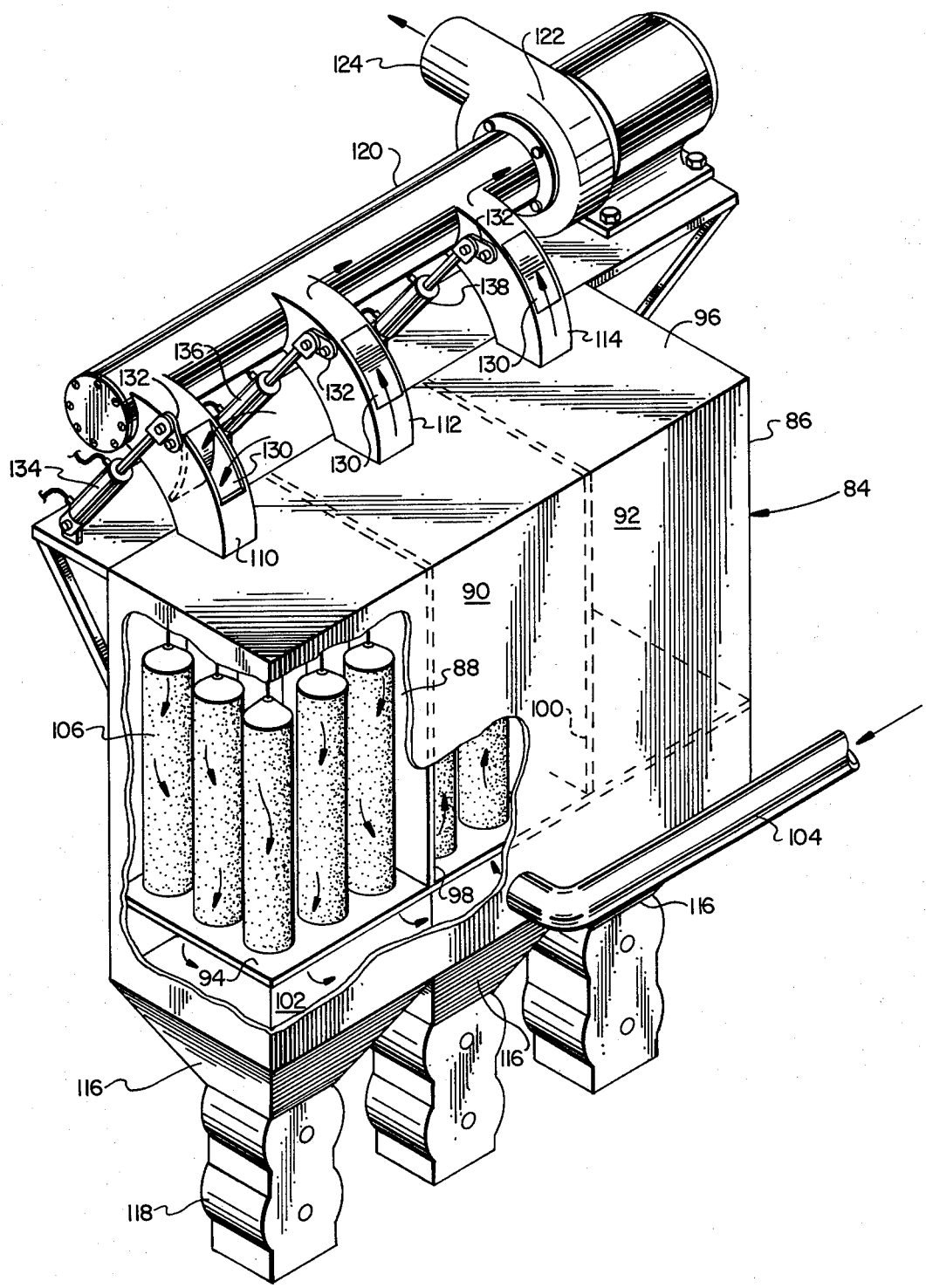
FIG. 9 is a perspective view of a pneumatic dust collection and filtration system utilizing the timing and sequencing actuator of the present invention.
Figure 10:
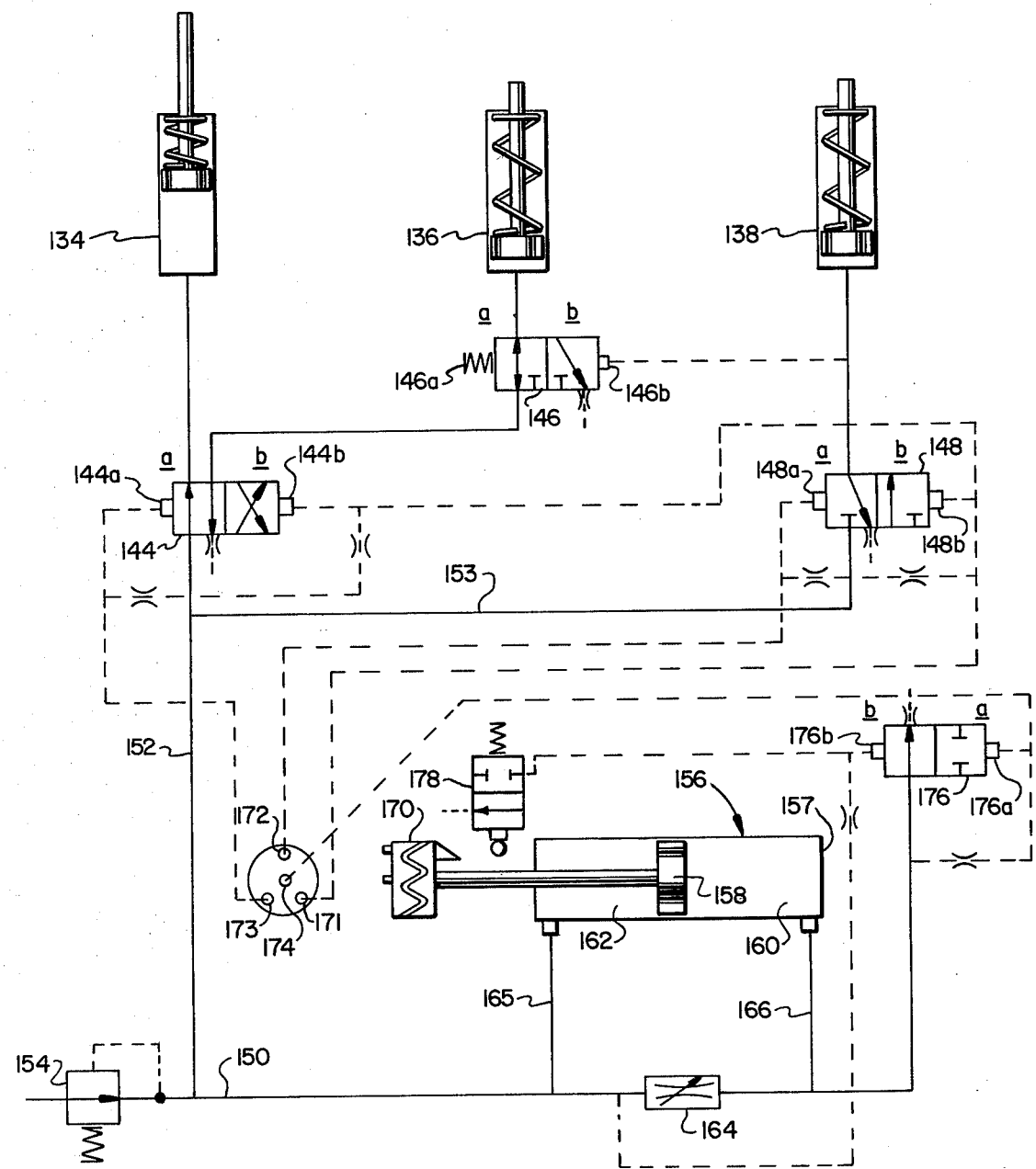
FIG. 10 is a schematic diagram of the timing and sequencing apparatus for the system illustrated in FIG. 9.

Referring now to FIGS. 9 and 10, another embodiment of the instant invention will be described. FIG. 9 illustrates another embodiment of a dust collection and filtration unit generally designated by the numeral 84. The dust collection unit 84 includes a generally rectangular cabinet 86 which is divided into a plurality of separate filter chambers 88, 90, and 92 formed by a transverse interior bottom partition 94, a top wall 96 and intermediate vertical partitions 98 and 100. Dust laden air is admitted to a common chamber or manifold portion 102 by way of a conduit 104 and flows into the interiors of a plurality of hollow elongated fabric tube filter elements 106 disposed within the respective chambers 88, 90 and 92. Dust laden air flows from the chamber 102 into the interior of the elements 106, in each of the respective chambers 88, 90 and 92, and then through the porous fabric of the elements and out of the chambers through respective discharge ducts 110, 112 and 114. Dust which separated from air flowing through the chamber 102 and dust which is periodically cleaned from the interior walls of the elements 106 is allowed to collect in respective hopper portions 116 formed as part of the cabinet 86. The interior of the cabinet 86 is isolated from the atmosphere by a series of double gate valves 118 which are connected to the lower end of each of the hopper portions 116. The basic filter unit structure, forming no part of the present invention, is known to those skilled in the art of dust collection equipment and will not be described in further detail herein.

The ducts 110, 112 and 114 are connected to a common discharge manifold duct 120 which is connected to a suitable motor driven suction fan or blower 122 having a discharge shroud opening 124 for discharging dust free air to atmosphere. In the arrangement illustrated in FIG. 9, dust laden air is drawn through the filter unit 84 at such a rate that the pressure in the cabinet 86 is normally less than atmospheric pressure.

As shown by way of example for the duct 110, each of the discharge ducts is formed with a movable gate or wall portion 130 suitably hinged to the remainder of the duct and connected to an actuating link 132. The actuating link 132 is connected to the distal end of the piston rod of a one way, spring return pneumatic cylinder actuator 134 suitably mounted on the top of the cabinet 86, as shown. The ducts 112 and 114 are also each provided with movable gate or wall portions 130 of ducts 112 and 114 and which are actuated to move between open and closed positions by respective actuators 136 and 138. When the gate portions of the ducts 112 and 114 move from the closed position shown in FIG. 9 to an open position, as shown for the gate portion 110, thereby blocking the flow of air from the respective ducts to the manifold duct 120, a momentary large volume reverse flow of air enters from atmosphere into the respective chambers containing the filter elements 106 to provide a backflushing action on the filter elements to dislodge dust caked on the interior of the elements and allow such material to fall into the hoppers 116.

In order to maintain a fairly uniform flow of air through the dust collection and filtration unit 84, the gates associated with the respective actuators 134, 136 and 138 are preferably sequentially operated by a timing and sequencing apparatus in accordance with the present invention and including an actuator similar to the actuators 14 and 41.

Referring now to FIG. 10, a timing and sequencing actuator is shown in conjunction with a control circuit for operating the cylinder actuators 134, 136 and 138. Each of the cylinder actuators are supplied with pressure air by way of respective, two position valves 144, 146 and 148. The valves 144, 146 and 148 are connected to receive pressure air by way of a supply conduit 150 through branch portions 152 and 153 from a source of pressure air, not shown. The supply conduit 150 may include a suitable pressure regulator 154. The actuators 134, 136 and 138 are preferably sequentially actuated in timed relationship to each other by a timing and sequencing actuator generally designated by the numeral 156. The actuator 156 is similar to the actuators 14 and 41 and has a piston 158 dividing a cylinder 157 into opposed chambers 160 and 162 which are, respectively, in communication with the pressure air supply conduit 150 as illustrated. An adjustable timing orifice 164 is interposed in the conduit 150 between passageways 165 and 166 leading to the chambers 162 and 160. The piston 158 is connected to a suitable sequencing cam 170 which is operable to sequentially actuate poppet type pilot bleed air valves 171, 172 and 173 which are similar to the valve 63 illustrated in FIG. 3. In fact, the general construction of the apparatus 156 may be similar to that shown in FIG. 3 except for the elimination of the orifice $O_B$. The arrangement of the actuator 156 also includes a poppet type pilot valve 174 which is adapted to be actuated by the cam 170 on every extension stroke of the piston 158 whereas the valves 171, 172 and 173 are sequentially actuated on successive extension strokes of the piston 158.

Conduit 150 is also connected to a two position pilot operated valve 176 which is biased closed in position a by pilot actuator 176a and is biased open, position b, by pilot actuator 17b. Upon actuation of the pilot valve 174 to relieve the pressure in pilot actuator 176a, the valve is operable to move to position b to rapidly reduce the pressure in the conduit 150 downstream of the orifice 164 and including the chamber 160. Pilot actuator 176b is in communication with a pilot bleed valve 178 which is arranged to be actuated by the cam 170 during the retraction stroke of the piston 158 to open and bleed air away from the actuator 176b so that the valve 176 will shift to its position a during or on completion of the piston retraction stroke.

The system for actuating the duct gate portions for the dust collection and filter unit 84 can perhaps be best understood by description of a typical operating sequence of the actuators 134, 136 and 138. Each of the valves 144, 146 and 148 are provided with suitable pilot actuators, pilot flow lines and orificed portions thereof as indicated in FIG. 10. Valve 146 is pilot operated into position b by a pilot actuator 146b in communication with the conduit branch 153 downstream of valve 148. Valve 146 is normally biased into position a by a spring actuator 146a.

In the position illustrated in the schematic diagram of FIG. 10, valve 144 is in its position a to supply pressure fluid to actuator 134 to cause that actuator to open the associated gate 130 while actuators 136 and 138 are in the retracted positions such that their gates are closed. The actuator 156 is considered to be on a retraction stroke having just actuated the pilot valve 171 associated with pilot actuators 148b and 144b. The valve 176 is in its position b since the pilot valve 174 has been actuated by the sequencing cam 170 to reduce the fluid pressure acting on the actuator 176a. As the piston 158 and cam 170 return to the retracted position, the pilot valve 178 is engaged by the cam 170 and opened to thereby bleed pressure air from actuator 176b shifting the valve 176 to its position a. When valve 171 closes, actuator 144b also becomes pressurized and shifts valve 144 to its position b to vent the gate actuator 134. After a suitable time delay as determined substantially by the volume of chamber 160 and the size of the orifice 164 an unbalanced pressure force will cause the piston 158 to extend to the left, viewing FIG. 10, to allow the cam 170 to move off of the actuator of pilot valve 178 whereby the pressure in actuator 176b will increase. In the meantime, the cam 170 has been indexed such that on the extension stroke of the piston 158 it will actuate pilot valve 172 associated with the actuator 148a of valve 148. As the cam actuator 170 engages the pilot valve 172, it also engages the pilot valve 174 to open that valve and reduce pressure in actuator 176a to shift valve 176 to its position b thereby again relieving the pressure in the conduit 150 downstream of the orifice 164.

When the pilot actuator valve 172 associated with actuator 148a is opened, valve 148 shifts to the position b to provide pressure fluid to the actuator 138 to effect opening of the associated gate connected thereto. With pressure fluid supplied to actuator 138, actuator 146b shifts valve 146 to position b to assure that the pressure chamber of the actuator 136 is vented to atmosphere and is in the retracted position. As the piston 158 of the timing and sequence actuator 156 moves to its retracted position, the pilot valve 172 is closed. A pressure increase in actuator 148a will then result in shifting the valve 148 to its position a to vent the actuator 138 to allow the associated gate on the duct 114 to close.

As the actuator piston 158 returns to its retracted position and effects shifting of the valve 176 to its closed position, the timing of another stroke of the actuator piston 158 is continued by the filling of the chamber 160 at a substantially constant rate. Assuming a critical or subcritical flow condition is maintained across the orifice 164 throughout the chamber filling cycle, a consistent rate of change of pressure ratio across the orifice is also maintained. As soon as chamber 160 fills to a pressure level such that the actuator 156 senses an unbalanced pressure force on the piston 158, the cam 170 is again extended to engage valve 173 connected in flow communication with valve actuator 144a. This occurs when the pressure ratio across orifice 164 slightly exceeds the area ratio of the opposed surfaces of the piston 158. This will effect shifting of valve 144 to its position b and, since valve 146 is in its position a, pressure air will be conducted to actuator 136 to open the gate in duct 112 to provide reverse flow of ambient air into chamber 90. Again, actuation of the pilot valve 174 will shift valve 176 to its position b to allow the piston 158 to begin its retraction stroke. Upon closure of the pilot valve 173, the valve 144 may remain in the b position to hold the gate 136 open until the next extension stroke of the piston 158 which will cause the cam 170 to again engage pilot valve 171 associated with the actuators 144b and 148b whereupon valve 144 will shift to position a to vent actuator 136 and extend actuator 134 to effect opening of the gate 130 connected thereto.

From the foregoing description, it will be appreciated that the timing and sequencing apparatus 156 may be advantageously used in conjunction with a unique sequencing control circuit for effecting reverse flow cleaning of fabric type dust collection and filtration elements.

Figure 11:
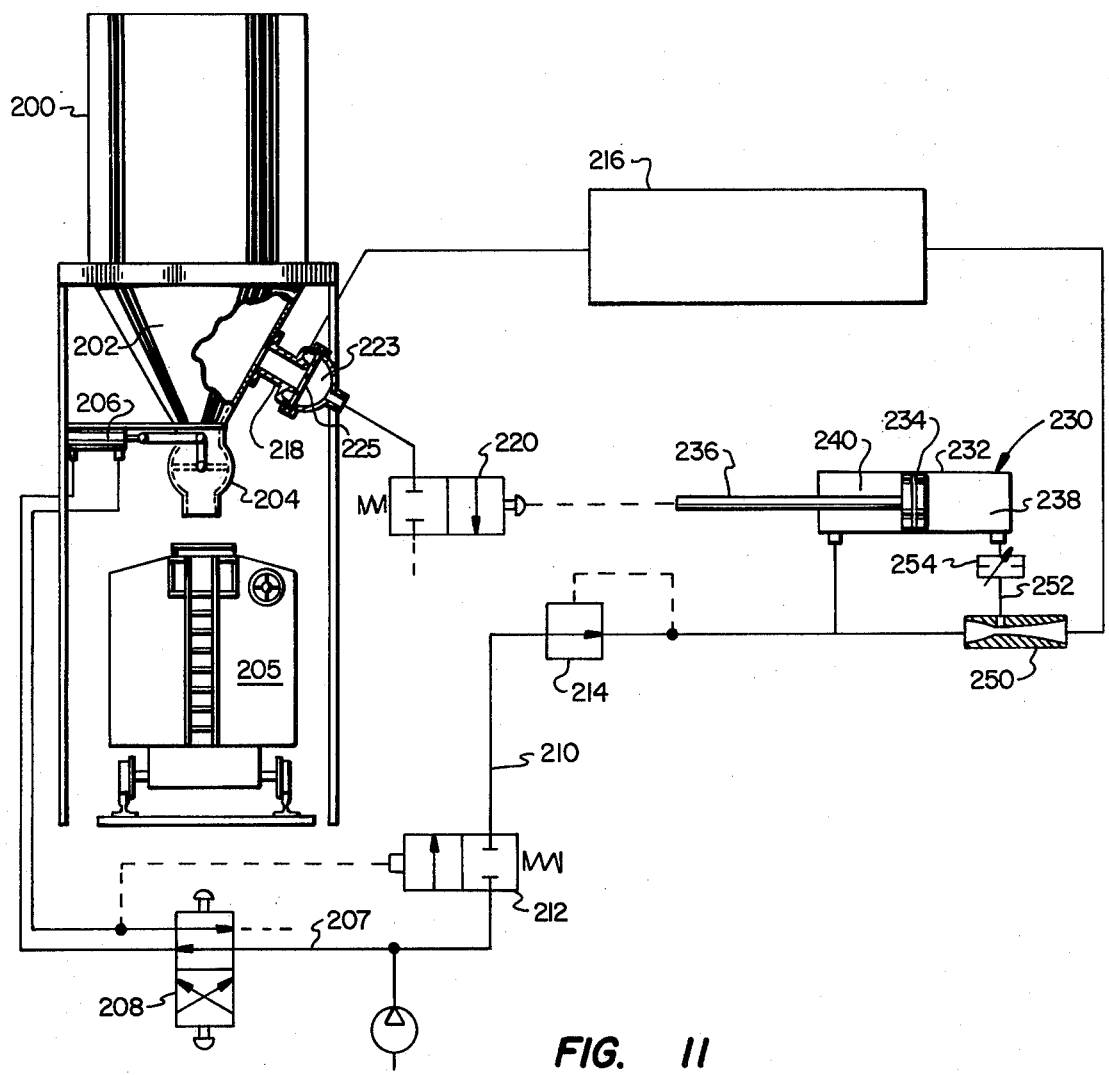
FIG. 11 is a schematic diagram of a pneumatic bulk material storage bin blasting system in accordance with the present invention.

Referring now to FIG. 11, there is illustrated another embodiment of a timing actuator of the present invention used in conjunction with a system wherein the timing actuator is connected to a working fluid conduit and it is desired to minimize the flow restriction in the working fluid conduit such as, for example, in order to transfer a relatively large volume of fluid in a short time period. FIG. 11 illustrates an arrangement of a bulk material storage bin of a conventional type and generally designated by the numeral 200. The bin 200 includes a somewhat conical discharge hopper portion 202 having a power actuated dump valve 204 disposed at the bottom thereof for controllably discharging bulk material from the bin 200 to a suitable container such as a railcar 205. The valve 204 is adapted to be remote controlled by a pneumatic actuator 206 which is supplied with pressure fluid from a source by way of a conduit 207 and a suitable control valve 208.

The storage bin 200 is also provided with an arrangement for discharging a timed pulse or blast of compressed air into the interior of the bin to dislodge material that may be compacted or resistant to flow out of the bin through the discharge valve 204. In the arrangement according to FIG. 11, a main working fluid conduit for the pneumatic blasting operation is connected to the aforementioned source and is designated by the numeral 210. The conduit 210 may have interposed therein a suitable pilot operated on-off flow control valve 212 having a pilot operator connected to one of the control conduits for the actuator 206 downstream of the control valve 208. The working fluid conduit 210 may include a suitable pressure regulator 214 interposed therein. The working fluid conduit 210 is also connected to a pressure vessel or reservoir 216. The reservoir 216 is connected to a suitable quick opening valve 218 mounted on the hopper portion 202. The valve 218 is of a type which is pilot operated to open in response to bleeding pressure fluid from a valve actuator by way of a pilot relief valve 220. The valve 218 may, for example, be similar to the valves 54 and have a diaphragm type closure member 225 which is normally biased in the closed position but is allowed to open rapidly upon reduction of pressure in a chamber 223. Accordingly, opening of the valve 218 will allow rapid flow of a pulse or blast of compressed air out of the reservoir 216 and by way of the conduit 210 to dislodge and maintain material within the bin 200 in a fluidized state.

The pneumatic bin blasting or fluidizing apparatus illustrated in FIG. 11 includes a timing actuator in accordance with the present invention and generally designated by the numeral 230. The timing actuator 230 includes a cylinder member 232 and a piston 234 including a rod portion 236 extending from one end of the cylinder in a manner similar to the arrangements illustrated in FIGS. 1, 2, 3 and 10. Accordingly, pressure chambers 238 and 240 are formed within the cylinder 232 and the piston 234 has opposed effective fluid areas, the larger of which is exposed to the chamber 238. The timing actuator 230 is operable to extend its piston rod 236 to engage and effect operation of the pilot operator valve 220 to vent the chamber 223 to provide for quick opening of the valve 218. The timing actuator 230 is in communication with the conduit 210 in such a way that the chamber 240 is connected to the aforementioned conduit on the upstream side of a minimum pressure loss nozzle or venturi, generally designated by the numeral 250. The chamber 238 is in communication with the conduit 210 by way of a passageway 252 which opens into the fluid flow path formed by the venturi 250 approximately at the throat or smallest cross-sectional flow area portion of the venturi. The passageway 252 includes a flow restriction in the form of a timing orifice 254 which may be adjustable in the size of its effective flow area. The orifice 254 is suitably sized such that when pressure in conduit 252 increases to provide flow into chamber 238, as reservoir 216 is filled and flow diminishes over venturi 250, the orifice will experience critical and/or subcritical flow and a consistent rate of change of pressure ratios will occur until the reservoir 238 is filled to a level whereby the pressure ratio across the orifice is essentially equivalent to the ratio of pressure differential acting on the pressure faces of piston 234 in proportion to that needed to move the piston. As the piston extends in its cavity, the pressure ratio over the orifice will be essentially the same as the ratio of forces on the opposing piston faces irregardless of the supply pressure in conduit 210 and the time of the extending stroke will be substantially constant. By utilizing a low pressure loss nozzle or venturi, the resistance to flow in the conduit 210 is minimized and a reduction in pressure within the chamber 238 to effect retracting of the piston 234 is accomplished by exposing the chamber 238 to a reduced pressure in the conduit 210 by connecting the chamber 238 to the venturi at substantially its throat portion by way of the passageway 252. In this way, a reduction in pressure in the chamber 238 below that which is sufficient to effect retraction of the piston 234 may be accomplished with minimal flow and pressure losses in the fluid flowing through the working fluid conduit 210.

In the operation of the apparatus illustrated in FIG. 11, when the valve 208 is moved to effect opening of the bin closure valve 204, the pilot actuator of valve 212 is operable to open valve 212 to permit flow of fluid through the conduit 210 to the reservoir 216. The pressure in the chamber 240 will be greater than that in the chamber 238 during flow through the venturi 250 since the passageway 252 will be sensing a reduced pressure at the throat of the venturi. Accordingly, the piston 234 will move toward a retracted position if it is not already in such position and the pilot valve 220 will be closed as will the valve 218. As soon as the reservoir 216 becomes sufficiently full that the flow through the venturi 250 is reduced to allow pressure fluid to flow into the chamber 238 through the timing orifice 254, a predetermined timed increase in pressure in the chamber 238 will begin until an unbalanced pressure force acting on the piston 234 causes it to extend the rod 236 to engage the pilot valve 220.

When the pilot valve 220 is actuated to open, air will be bled from the chamber 223 of valve 218 to provide quick opening of the closure diaphragm 225 and a rapid pulse or blast of pressure air will be released into the interior of the bin hopper portion 202. The rapid reduction in pressure in the volume chamber 216 caused by the outflow of fluid will result in rapid flow through conduit 210 to refill the chamber. However, the reduced pressure at the venturi throat sensed in the passageway 252 and the chamber 238 will result in an unbalanced pressure force acting on the piston 234 to effect retraction of the piston to the right, viewing FIG. 11, to effect closure of the pilot valve 220 and the valve 218.

As the piston 234 retracts, pressure in the conduit 210 will also begin to increase and a reduced pressure differential between the chambers 238 and 240 will occur. As flow continues across venturi 250 and the pressure in reservoir 216 increases, fluid will commence flowing through orifice 254 into chamber 238 to commence a pressure buildup in the chamber which, when sufficient to effect movement of the piston 234 on its extension stroke, will cause a repeat cycle of the opening of the valve 218. Such an arrangement of a venturi, a flow limiting orifice and a timing actuator assures that pressure in reservoir 216 will increase to a desired level before the valve 218 is again opened. Thanks also to the arrangement of the venturi 250 and the passageway 252, which places the chamber 238 in communication with the nozzle at substantially the throat thereof, the timing actuator 230 may be used in systems wherein flow and pressure losses within the working fluid conduit must be minimized, such as in transferring large volumes of fluid within a relaively short time period.

Figure 12:
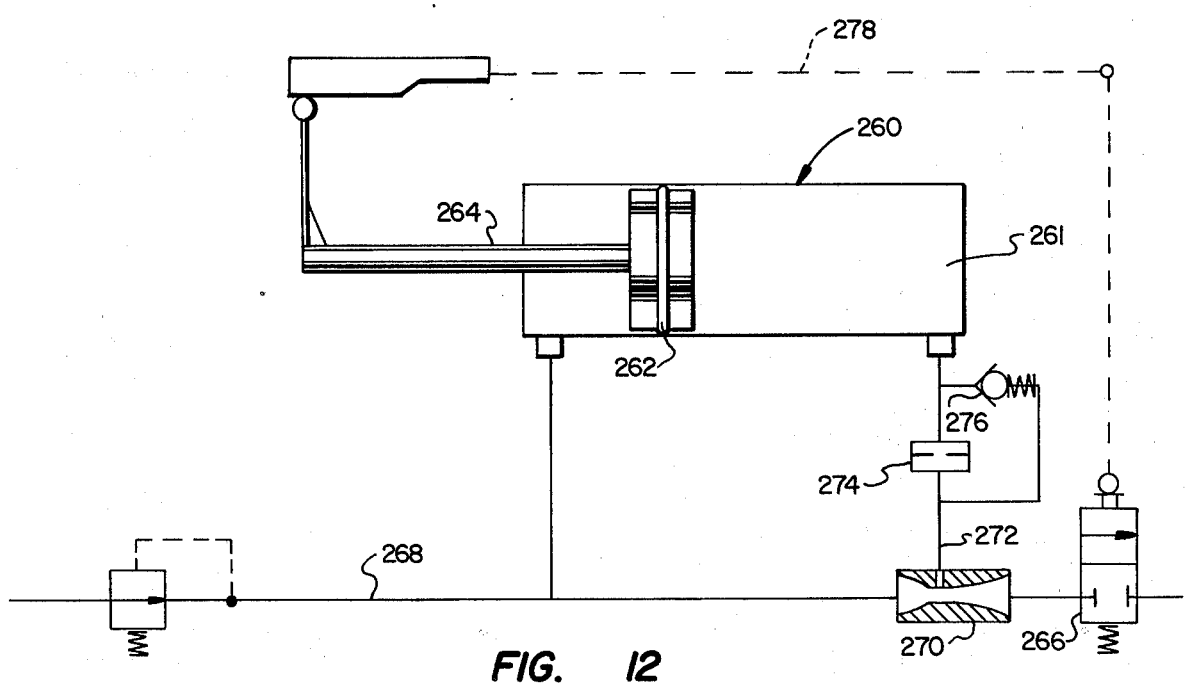
FIG. 12 is a schematic diagram of another alternate embodiment of a timing apparatus in accordance with the present invention.

A still further embodiment of the timing actuator, generally of the type illustrated in FIG. 11, is shown in FIG. 12. Referring to FIG. 12, a timing actuator 260 is illustrated including a piston 262 and a piston rod 264 may be adapted to operate various control devices and be suitably operably connected to a shutoff valve 266 by suitable linkage 278 similar to the linkage for the actuator shown in FIG. 2. The valve 266 is interposed in a working fluid conduit 268 which is adapted to be connected to a source of pressure fluid, not shown. The arrangement of the timing actuator 260 is similar to the aforementioned embodiments of FIG. 11 in that the so-called blind end or larger piston area chamber 261 is in communication with a venturi 270 by way of a passage 272 which communicates with the venturi at substantially the throat portion thereof.

The timing actuator 260 also includes a timing orifice 274 which may be adjustable but as with the previous embodiments limits the flow of fluid out of the chamber 261 so that the cycle time of the piston is effected by the size of the orifice 274. However, in the arrangement of FIG. 12, the timing actuator is provided with a one way bypass valve 276 which is connected to the passageway 272 across the timing orifice 274. Accordingly, when the valve 266 is open and a substantial flow of fluid is occurring through the conduit 268 and the venturi 270, the pressure drop at the venturi throat will be sensed by the valve 276 which will open to allow rapid outflow of fluid from the chamber 261 without the restriction of the orifice 274. Accordingly, the timing characteristics of the actuator 260 during the retraction stroke phase thereof may be altered by providing the one way bypass valve 276. When flow in the passageway 272 is reversed and the chamber 261 begins to fill, the valve 276 is closed and all of the fluid flowing into the chamber 261 must pass through the orifice 274 wherein a limited or controlled filling of the chamber is accomplished to effect the timing of the next extension stroke of the piston 262.

Those skilled in the art will appreciate from the foregoing that several embodiments of a unique timing and sequencing apparatus are provided by the present invention. Moreover, several of the embodiments are particularly adapted for use in conjunction with pressure fluid systems which require timed as well as sequenced performance of certain functions. The arrangements for the dust collection and filtration system as well as the bin blasting or fluidizing system are believed to be particularly superior due to the provision of the particular control circuits disclosed and which include the inventive timing and sequencing apparatus. Those skilled in the art will appreciate that various substitutions and modifications may be made to the apparatus and systems disclosed herein without departing from the scope and spirit of the invention as recited in the appended claims.

What I claim is:

1. A cyclic event timing system comprising:

fluid cylinder means;

fluid piston means disposed in said cylinder means and dividing said cylinder means into first and second opposed fluid chambers, said piston means being reciprocable through a timing stroke and a retraction stroke, said piston means having first and second unbalanced effective fluid areas exposed to said first and second chambers, respectively, with the first fluid area being larger than the second fluid area and effective to urge said piston means in the direction of said timing stroke and the second fluid area being effective to urge said piston means on said retraction stroke;

conduit means for communication with a source of pressure fluid and with valve means operable to be in open and closed positions for delivering pressure fluid to means for performing a work function and for restricting flow of pressure fluid through said conduit means, respectively, said valve means being operatively interconnected with said piston means so as to be responsive to movement of said piston means on said timing stroke and said retraction stroke to be actuated to an open position and a closed position, respectively;

a first passageway in communication with said first chamber and said conduit means between said source of pressure fluid and said valve means for conducting pressure fluid to act on said first fluid area, a second passageway in communication with said second chamber and with said conduit means between said source of pressure fluid and the point of communication of said first passageway with said conduit means, said piston means being responsive to a predetermined pressure condition in said conduit means and said first and second chambers to move on a timing stroke to open said valve means; and first orifice means interposed in said conduit means between said first and second passageways and constructed so as to provide a resistance to fluid flow through said conduit means sufficient to provide for pressure fluid acting on said second fluid area to move said piston means on a retraction stroke to effect closing of said valve means, and the rate at which said piston means is acted on by pressure fluid to effect a timing stroke is controlled by the rate at which fluid flows through said first passageway to act on said first fluid area.

2. The system set forth in claim 1 wherein:

the ratio of the second fluid area to the first fluid area is less than about 0.528 and said first orifice means is sufficient to provide a pressure ratio between the fluid pressures in said conduit means on opposite sides of said first orifice means of less than about 0.528 whereby the total time required by said piston means to effect a timing stroke is constant regardless of the pressure in said conduit means between said source and said first orifice means.

3. The system set forth in claim 1 including:

indexing cam means connected to said piston means for sequentially actuating a plurality of pilot valve means on successive timing strokes of said piston means, and a plurality of pilot actuated valves connected to respective ones of said pilot valve means for receiving a pilot pressure fluid signal from said pilot valve means, respectively, to cause said pilot actuated valves to conduct pressure fluid from said source to means for performing said work function.

4. The system set forth in claim 1 wherein:

said valve means comprises at least one pilot actuated valve operated between open and closed positions by a pilot actuator operably connected to pilot valve means, said pilot valve means being responsive to movement of said piston means on said timing stroke to actuate said at least one pilot actuated valve to decrease fluid pressure in said first passageway.

5. A cycle timing system for controlling the flow of a pressure fluid wherein relatively large volumes of said fluid are supplied by a source and are released cyclically to perform a work function, said system comprising: a conduit connected to said source and to a valve operable to release timed flow of pressure fluid from said conduit to perform a work function, cylinder means, piston means disposed in said cylinder means and defining first and second opposed fluid chambers, first and second pressure surfaces on said piston means facing said first and second chambers, respectively, said first pressure surface having an effective area less than said second pressure surface, said piston means being operably connected to said valve to effecting opening and closing of said valve in response to movement of said piston means under the urging of pressure fluid acting on said piston means, first and second passage means in communication with said first and second chambers, respectively, and with said conduit, said first passage means providing relatively unrestricted fluid flow communication between said first chamber and said conduit, said second passage means being in communication with said conduit between the point of communication of said first passage means with said conduit and said valve, and means forming a flow restriction interposed in said conduit between said point of communication of said first passage means with said conduit and said valve whereby said piston means is operable in response to pressure fluid flowing to said first and second chambers from said source when said valve is closed to move through a timing stroke to open said valve, and then through a retraction stroke to close said valve in response to changes in fluid pressures in said second chamber relative to said first chamber.

6. A system for reverse air flow cleaning of a plurality of air filter elements including a plurality of pilot pressure fluid operated valves in communication with a source of pressure air by way of a conduit, a plurality of pilot control valves for providing a pressure fluid signal to respective ones of said fluid operated valves, and means for sequentially actuating said pilot control valves to actuate said fluid operated valves, respectively, comprising:

cylinder means, piston means disposed in said cylinder means and dividing said cylinder means into first and second opposed fluid chambers, said piston means including first and second pressure surfaces of different effective areas and exposed to said first and second chambers, respectively, said piston means being operatively connected to said pilot control valves to actuate a selected one of said pilot control valves in sequence during successive timing strokes of said piston means, first and second passageways in communication with said conduit and with said first and second chambers, respectively, between said source and said fluid operated valves, a flow restricting orifice interposed in said conduit between said first and second passageways and constructed so as to provide a pressure differential between said first and second passageways in response to opening one of said fluid operated valves to effect a retraction stroke of said piston means, said piston means being operable to move through repeated cycles, each cycle including a timing stroke and a retraction stroke for sequentially opening and closing said fluid operated valves in response to pressure fluid acting on said piston means, the duration of said cycles being substantially independent of the fluid pressure of said source.

7. A dust collection system for separating dust particles from an air flowstream, said dust collection system including a plurality of separate filter elements disposed in cabinet means, air discharge duct means disposed in flow communication with respective ones of said filter elements, a suction blower for drawing air through said filter elements and said duct means at a reduced pressure, gate means positioned and arranged with respect to ones of said duct means for momentarily blocking the flow of air to said suction blower and permitting a backflow of ambient air through said duct means to remove dust accumulated on said filter elements, pressure fluid operated gate actuator means connected to respective ones of said gate means, and a pneumatic control circuit including a plurality of gate actuator control valves operable to be actuated sequentially to effect sequentially timed opening and closing of said gate means by operation of said gate actuator means, said control circuit comprising:

cylinder means, piston means disposed in said cylinder means and dividing said cylinder means into first and second opposed fluid chambers, said piston means including first and second pressure surfaces of different effective areas and exposed to said first and second chambers, respectively, a conduit for communication with a source of pressure fluid and with a timing control valve, said piston means being operable to actuate said timing control valve and a selected one of a plurality of pilot valves for each of said gate actuator control valves during a timing stroke of said piston means, first and second passageways in communication with said conduit and with said first and second chambers, respectively, between said source and said timing control valve, a flow restricting orifice interposed in said conduit between said first and second passageways and constructed so as to provide a pressure differential between said first and second passageways in response to opening of said timing control valve to effect a retraction stroke of said piston means, said piston means being operable to move through repeated cycles, each cycle including a timing stroke and a retraction stroke for sequentially opening and closing said gates in response to pressure fluid acting on said piston means, the duration of said cycles being substantially independent of the fluid pressure of said source.

8. A system for delivering cyclic charges of pressure air to a bulk material storage bin to fluidize material in said bin to flow freely from said bin, said system comprising:

a power actuated valve operably connected to said bin for communication with said bin and with a source of pressure air by way of a conduit, pilot signal producing means for providing a pilot control signal to actuate said power actuated valve to open in response to actuation of said pilot signal producing means, and a cyclic timing actuator for actuating said pilot signal producing means to effect delivery of periodic timed charges of pressure air to said bin through said power actuated valve, said timing actuator comprising:

cylinder means, piston means disposed in said cylinder means and dividing said cylinder means into first and second opposed fluid chambers, said piston means including first and second pressure surfaces of different effective areas and exposed to said first and second chambers, respectively, said piston means being operatively connected to said pilot signal producing means to actuate said pilot signal producing means during a timing stroke of said piston means, first and second passageways in communication with said conduit and with said first and second chambers, respectively, between said source and said power actuated valve, a flow restricting orifice interposed in said conduit between said first and second passageways and constructed so as to provide a pressure differential between said first and second passageways in response to opening of said power actuated valve to effect a retraction stroke of said piston means, said piston means being operable to move through repeated cycles, each cycle including a timing stroke and a retraction stroke for effecting the opening and closing of said power actuated valve in response to pressure fluid acting on said piston means, the duration of said cycles being substantially independent of the fluid pressure of said source.

9. The system set forth in claim 8 wherein:
said bin includes a discharge valve and a fluid operated actuator for opening and closing said discharge valve for said bin, a control valve in flow communication with said actuator for valving pressure fluid to said actuator for said discharge valve from said source to open said discharge valve, and a pilot operated valve interposed in said conduit between said orifice and said source and responsive to movement of said control valve to conduct pressure fluid to said actuator for said discharge valve to open to conduct pressure air to said timing actuator and said power actuated valve.

10. A cyclic event timing system comprising:
fluid cylinder means;
fluid piston means disposed in said cylinder means and dividing said cylinder means into first and second opposed fluid chambers, said piston means being reciprocable through a timing stroke and a retraction stroke, said piston means having first and second unbalanced effective fluid areas exposed to said first and second chambers, respectively, with the first fluid area being larger than the second fluid area and effective to urge said piston means through said timing stroke and the second fluid area being effective to urge said piston means through said retraction stroke;
conduit means for communication with a source of pressure fluid and with valve means operable to be in open and closed positions for delivering a substantial quantity of pressure fluid to means for performing a work function and for restricting flow of pressure fluid through said conduit means, respectively, said valve means being operatively connected to said piston means and responsive to movement of said piston means on said timing stroke and said retraction stroke to be actuated to an open position and a closed position, respectively;
a first passageway in communication with said first chamber and said conduit means between said source of pressure fluid and said valve means for conducting pressure fluid to act on said first fluid area, a second passageway in communication with said second chamber and with said conduit means between said source and the point of communication with said first passageway with said conduit means, said position means being responsive to a predetermined pressure condition in said conduit means and said first and second chambers to move said piston means on a timing stroke to open said valve means;
first orifice means comprising a venturi interposed in said conduit means between said first and second passageways, said first passageway being in fluid communication with said conduit means at substantially the throat of said venturi whereby in response to opening of said valve means the overall pressure losses in said conduit means are minimal during fluid flow therethrough and a reduced pressure at said throat and in said first passageway and said first chamber during fluid flow through said venturi is effective to cause said piston means to move through a retraction stroke to effect closing of said valve means.

11. The system set forth in claim 10 and further comprising:
a one way check valve in communication with said first chamber and said conduit means and constructed so as to conduct pressure fluid out of said first chamber in response to a reduced fluid pressure in said venturi to effect an increased rate of movement of said piston means through said retraction stroke.

12. The system set forth in claim 10 further comprising:
means for discharging a momentary volume of pressure fluid to fluidize bulk material in a storage bin to enhance flow of said material from said bin, said valve means being in communication with passage means opening into said bin, and said valve means including pilot actuator means for operating said valve means; and
a pilot valve operably connected to said piston means for actuation by said piston means during movement of said piston means through said timing stroke to cause said pilot actuator means to open said valve means to deliver pressure fluid to said bin.

13. A cyclic event timing system comprising:
fluid cylinder means;
fluid piston means disposed in said cylinder means and dividing said cylinder means into first and second opposed fluid chambers, said piston means being reciprocable through a timing stroke and a retraction stroke, said piston means having first and second unbalanced effective fluid areas exposed to said first and second chambers, respectively, with the first fluid area being larger than the second fluid area and effective to urge said piston means in the direction of said timing stroke and the second fluid area being effective to urge said piston means on said retraction stroke;
conduit means for communication with a source of pressure fluid and with valve means operable to be in open and closed positions for delivering pressure fluid to means for performing a work function and for restricting flow of pressure fluid through said conduit means, respectively, said valve means being operatively interconnected with said piston means so as to be responsive to movement of said piston means on said timing stroke and said retraction stroke to be actuated to an open position and a closed position, respectively;
a first passageway in communication with said first chamber and said conduit means between said source of pressure fluid and said valve means for conducting pressure fluid to act on said first fluid area, a second passageway in communication with said second chamber and with said conduit means between said source of pressure fluid and the point of communication of said first passageway with said conduit means, said piston means being responsive to a predetermined pressure condition in said conduit means and said first and second chambers to move said piston means on a timing stroke to open said valve means;

first orifice means interposed in said conduit means between said first and second passageways and constructed so as to provide a resistance to fluid flow through said conduit means sufficient to provide for pressure fluid acting on said second fluid area to move said piston means on a retraction stroke to effect closing of said valve means; and second orifice means interposed in said first passageway between said first chamber and said conduit means, the effective flow area of said second orifice means being less than the effective flow area of said first orifice means so that the duration of a timing stroke of said piston means is determined by the volume of said first chamber and the effective flow area of said second orifice means.

14. The system set forth in claim 13 including:
means for adjusting the effective flow area of said second orifice means.

15. The system set forth in claim 13 wherein:
said first orifice means is a venturi and said first passageway is in communication with said conduit means at said venturi.

16. The system set forth in claim 13 including:
check valve means in communication with said first passageway for venting pressure fluid from said first chamber and bypassing said second orifice means in response to opening of said valve means and a reduction in fluid pressure in said conduit means between said first orifice means and said valve means.

* * * * *